(12) United States Patent
Wang et al.

(10) Patent No.: US 11,359,490 B2
(45) Date of Patent: Jun. 14, 2022

(54) MULTI-FUNCTIONAL INTELLIGENT TUNNELING APPARATUS AND METHOD FOR SIMULATING PARTIAL EXCAVATION OF TUNNEL

(71) Applicant: CHINA UNIVERSITY OF MINING AND TECHNOLOGY, Jiangsu (CN)

(72) Inventors: Yingchao Wang, Jiangsu (CN); Chaoyang Li, Jiangsu (CN); Shengqi Yang, Jiangsu (CN); Qinglei Jiao, Jiangsu (CN); Bo Meng, Jiangsu (CN); Hongwen Jing, Jiangsu (CN); Yueming Wang, Jiangsu (CN)

(73) Assignee: CHINA UNIVERSITY OF MINING AND TECHNOLOGY, Jiangsu (CN)

( * ) Notice: Subject to any disclaimer, the term of this patent is extended or adjusted under 35 U.S.C. 154(b) by 0 days.

(21) Appl. No.: 16/487,048

(22) PCT Filed: Nov. 16, 2018

(86) PCT No.: PCT/CN2018/115776
§ 371 (c)(1),
(2) Date: Sep. 20, 2021

(87) PCT Pub. No.: WO2019/200904
PCT Pub. Date: Oct. 24, 2019

(65) Prior Publication Data
US 2022/0010680 A1    Jan. 13, 2022

(30) Foreign Application Priority Data
Apr. 19, 2018 (CN) .......................... 201810353517.7

(51) Int. Cl.
*E21D 9/10* (2006.01)
*E21D 11/15* (2006.01)
*E21D 9/00* (2006.01)

(52) U.S. Cl.
CPC .......... *E21D 9/003* (2013.01); *E21D 9/1006* (2013.01); *E21D 11/15* (2013.01)

(58) Field of Classification Search
CPC ........ E21D 9/003; E21D 9/1006; E21D 11/15
(Continued)

(56) References Cited

FOREIGN PATENT DOCUMENTS

| CN | 103794127 A | 5/2014 |
|----|-------------|--------|
| CN | 104634932 A | 5/2015 |

(Continued)

*Primary Examiner* — Frederick L Lagman
(74) *Attorney, Agent, or Firm* — Knobbe, Martens, Olson & Bear LLP

(57) ABSTRACT

The present disclosure discloses a multi-functional intelligent tunneling apparatus and method for simulating partial excavation of tunnel. The apparatus comprises an operating platform, a multi-functional rotary tunneling system, a precision power propulsion system, an information acquiring and processing system, a digital display control box and a slurry pumping device, wherein the multi-functional rotary tunneling system includes a plurality of independent operating channels, and can realize multi-functional simulation of a tunnel construction process, including drilling, slurry injecting, and partial excavation under real-time monitoring; under the control of the digital display control box, the precision power propulsion system can realize the fine control of the multi-functional rotary tunneling system by means of hydraulic monitoring and preset advance distance. The present disclosure can simulate partial excavation steps of tunnel well, ranging from drilling, slurry injecting, different partial excavation methods, supporting and data post-processing and analyzing of test. The operating and testing method are easy, and with high reliability and high degree of automation and intelligence.

10 Claims, 5 Drawing Sheets

(58) Field of Classification Search
USPC .......................................................... 405/138
See application file for complete search history.

(56) References Cited

FOREIGN PATENT DOCUMENTS

| | | | | | |
|---|---|---|---|---|---|
| CN | 105136507 | A | | 12/2015 | |
| CN | 108343445 | A | | 7/2018 | |
| CN | 108506005 | A | * | 9/2018 | ............ E21D 9/003 |
| CN | 110656949 | A | * | 1/2020 | |
| CN | 112761653 | A | * | 5/2021 | ............ E21D 9/003 |
| CN | 113107505 | A | * | 7/2021 | |
| JP | 2017166295 | A | | 9/2017 | |
| KR | 101322125 | B1 | * | 10/2013 | |

* cited by examiner

MULTI-FUNCTIONAL INTELLIGENT TUNNELING APPARATUS AND METHOD FOR SIMULATING PARTIAL EXCAVATION OF TUNNEL

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field of the Invention

The present invention relates to model test techniques for geologic hazards in tunnel works, particularly to a multi-functional intelligent tunneling apparatus and method for simulating partial excavation of tunnel.

Description of the Related Art

As the transportation construction cause is developed rapidly, China has become a country with the largest scale of tunnel works and the most difficult tunnel construction conditions in the world, wherein a large number of tunnel works under extremely complex geologic conditions are being constructed or planned to be constructed. A large number of soft rock tunnels, loess tunnels, and other tunnels with poor quality of surrounding rocks have to be excavated partially. Under the guidance of the similarity theory, model test can reproduce the actual engineering conditions excellently. Therefore, it becomes more and more meaningful for studying technical difficulties by performing model tests for tunnels under construction. At present, the excavation in model tests for tunnels is mainly manual excavation and full-section excavation with conventional tunneling machines, and it cannot restore the construction methods applied in actual tunnel construction processes. Therefore, it is urgent to develop a multi-functional intelligent tunneling apparatus that can simulate the partial excavation of actual tunnel to the greatest extent.

SUMMARY

Technical problem: the purpose of the present disclosure is to overcome the drawbacks in the prior art, and to provide a multi-functional intelligent tunneling apparatus and method for simulating partial excavation of tunnel, with simple structure, high level of automation and convenient operation.

Technical scheme: in order to attain the objects described above, the technical solution adopted by the present is as follows:

a multi-functional intelligent tunneling apparatus for simulating partial excavation of tunnel, comprising an operating platform, a slurry pumping system, a multi-functional rotary tunneling system, a precision power propulsion system and an information acquiring and processing system, wherein, the operating platform comprises an operating platform board, one side of the operating platform board is provided with a slurry pool and a pumping device which are used to constitute a slurry pumping system, and a slurry guide injector is provided above the pumping device to inject slurry into the slurry pool;

the multi-functional rotary tunneling system comprises a multi-functional rotary tunneling bucket, a support shaft and an elevating device, wherein the multi-functional rotary tunneling bucket is mounted on the operating platform board, the elevating device is mounted on the bottom of the operating platform board to adjust position, a set of operating channels independent from each other are disposed inside the multi-functional rotary tunneling bucket to perform drilling, slurry injecting or excavating work, the support shaft is mounted inside the multi-functional rotary tunneling bucket and the positions between the support shaft and respective operating channels are adjustable;

the precision power propulsion system comprises a screw propulsion rod, a transmission shaft, a semi-circular groove track disposed on the operating platform board, an engine and a gearbox, wherein, the engine and the gearbox are slidably mounted in the semi-circular groove track, one end of the transmission shaft is connected to the screw propulsion rod, the other end of the transmission shaft is connected to the gearbox, a set of circular holes matching with the transmission shaft in size are arranged in the surface of the gearbox, the circular holes are arranged in a preset shape to match different tunneling channels inside the multi-functional rotary tunneling bucket, so as to realize accurate partial excavation or full-section excavation of the tunnel with different construction methods, one end of the screw propulsion rod is connected to the transmission shaft, and the other end of the screw propulsion rod is connected to the independent operating channels;

the information acquiring and processing system comprises a digital display control box for intelligent control of the entire apparatus, a detection device for acquiring parameter information in the drilling, slurry injecting, or excavating process, and a computer for data processing, analyzing and displaying, wherein the digital display control box and the computer are communicatively connected with each other.

Preferably, the operating channels comprise a channel for tunneling with a cross diaphragm method, a channel for tunneling with the combination of a center diaphragm method and a three-bench method, a channel for tunneling with a three-bench seven-step method, a channel for tunneling with a double side drift method, which are used for accurate partial excavation or full-section excavation of the tunnel with different construction methods, and a drilling and slurry injecting channel for drilling and slurry injecting;

the detection device comprises a digital camera device, a micro camera and a hydraulic sensor, which are disposed on the operating platform board, wherein the digital camera device is configured to acquire image data of a tunnel excavation section;

diaphragm support plates and independent tunneling units separated by the diaphragm support plates are provided in the channel for tunneling with a cross diaphragm method, the channel for tunneling with the combination of a center diaphragm method and a three-bench method, the channel for tunneling with a three-bench seven-step method and the channel for tunneling with a double side drift method respectively, and one cross diaphragm support plate and four independent drilling and slurry injecting propulsion units are comprised in the drilling and slurry injecting channel, the rear ends of each independent tunneling unit and each drilling and slurry injecting propulsion unit are provided with preformed circular holes, and the other end of the screw propulsion rod is connected to the corresponding independent tunneling unit or drilling and slurry injecting propulsion unit through the preformed circular hole;

a tunneling cutter is provided on the front end of the independent tunneling unit, the micro camera is mounted on the tunneling cutter for real-time monitoring in the tunneling process; several rotary cylindrical steel shafts are provided on the tunneling cutter in the vertical direction, a cutter made of a thin steel plate is provided on the front side and back side of each cylindrical steel shaft, and steel wires are provided on the tunneling cutter at a fixed interval in the horizontal direction;

a drilling steel shaft or slurry injecting guide tube is provided on the front end of the drilling and slurry injecting propulsion unit and a slurry conveying tube is provided inside the drilling and slurry injecting propulsion unit, the slurry conveying tube is provided with a hydraulic sensor to monitor slurry injecting pressure, wherein, the drilling steel shaft is installed when drilling, and the drilling steel shaft is replaced with the slurry injecting guide tube after drilling, the slurry conveying tube and the slurry guide injector are connected with each other via a rubber hose to form a complete slurry injecting channel.

Preferably, the front end of the drilling steel shaft is a cone, and tail end of the drilling steel shaft is provided with a spring compensator to change the angle of the drilling steel shaft, the front end of the slurry injecting guide tube is a hollow cone, and slurry-permeable circular holes are provided on the surface of the slurry injecting guide tube.

Preferably, the diaphragm support plate inside the channel for tunneling with a cross diaphragm method is a removable cross diaphragm support plate composed of one four-direction connection steel member and four thin steel plates connected with the four-direction connection steel member, one end of the thin steel plate is connected with the four-direction connection steel member, and the other end of the thin steel plate is embedded in the channel for tunneling with a cross diaphragm method.

Preferably, the diaphragm support plate in the channel for tunneling with the combination of a center diaphragm method and a three-bench method is mainly composed of two four-direction connection steel members and seven thin steel plates; the diaphragm support plate in the channel for tunneling with a three-bench seven-step method is mainly composed of four four-direction connection steel members and ten thin steel plates; the diaphragm support plate in the channel for tunneling with a double side drift method is mainly composed of two three-direction connection steel members, four curved thin steel plates and one planar thin steel plate.

Preferably, male threads are provided on the surface of the transmission shaft, scale marks are provided on the surface of the screw propulsion rod and female threads that match the male threads are provided on the inner surface, and a spring button and a telescopic spring key are provided on the front end of the screw propulsion rod; when the spring button is pressed, the telescopic spring key is retracted into the rod; the screw propulsion rod is inserted into the preformed circular hole, and then the spring button is released; the telescopic spring key is located on two sides of the preformed circular hole, and the screw propulsion rod is fixed for connecting the independent tunneling unit or drilling and slurry injecting propulsion unit.

Preferably, the support shaft is provided with a spring control button and a telescopic spring key, wherein the spring control button is configured to open and close the telescopic spring key; a drill way for accommodating the support shaft is provided in the multi-functional rotary tunneling bucket, and a cylindrical groove to be fitted with the telescopic spring key is provided between each independent operating channel and the drill way.

Preferably, rotatable steel balls that match the semi-circular groove track in size are provided below the engine and the gearbox.

Preferably, the elevating device includes an elevating table leg provided under the operating platform board with rollers at the bottom.

The present disclosure further discloses a testing method for the above-mentioned multi-functional intelligent tunneling apparatus for simulating partial excavation of tunnel, which comprises the following operating steps:

Step A: Preparation Before Testing

Adjusting the digital display control box, placing the gearbox and the engine in the home positions, adjusting the elevating device so that the drilling and slurry injecting channel is aligned with the cross section of a tunnel to be excavated, injecting a prepared slurry into the slurry pool, fitting the screw propulsion rod over the transmission shaft, connecting the slurry guide injector and the slurry conveying tube via the rubber hose, according to the test needs, selecting a position of the cross section of the tunnel where the slurry is to be injected, determining the number of the drilling steel shafts and the rubber hoses to be used, and finally connecting the screw propulsion rod with the drilling and slurry injecting propulsion unit via the support shaft;

Step B: Drilling and Slurry Injecting

After the preparation work in the step A, setting a propulsion distance and drilling angle of the drilling steel shaft via the digital display control box, starting the engine to propel the drilling steel shaft into the cross section of the tunnel to the preset distance and then withdrawing the drilling steel shaft, replacing the drilling steel shaft with the slurry injecting guide tube, drilling into the rock mass to a predetermined position and starting slurry injection, observing the change of the value on the hydraulic sensor via a display unit on the digital display control box, and terminating the slurry injection when reaching a preset value;

Step C: Supporting with the Thin Steel Plate, Excavating, and Capturing Image

After the step B is finished, rotating the multi-functional rotary tunneling bucket to align with the tunnel excavation position after the rock mass can be excavated, mounting the transmission shaft on a preset position of the circular holes on the surface of the gearbox, and fitting the corresponding rotary propulsion rod over the transmission shaft, then connecting the four independent tunneling units, adjusting the digital display control box to make the thin steel plates on the tunneling cutters to be perpendicular to the excavated cross section of the tunnel, then starting the engine to excavate by any one of the excavation ways of full-section excavation by propelling four tunneling units simultaneously, excavation with a center diaphragm method or two-bench method by propelling two tunneling units simultaneously and excavation with a cross diaphragm method by propelling one tunneling unit at a time; monitoring the excavation process in real time with the micro cameras and the computer during the excavation process, adjusting the tunneling cutters when reaching a preset distance, so that the steel shafts of the tunneling cutters are rotated by 90 degree and the thin steel cutters and the tunneling units are sealed, then withdrawing the tunneling units in a screwed manner; at this time, activating the digital camera device to capture images of the excavated cross section of tunnel continuously and uploading the image data, for monitoring and analyzing the surrounding rock position field of the tunnel in the entire process.

Step D: Repeating Till Completion of the Work

After tunneling with the independent tunneling units for the first time, pushing the thin steel plates in contact with the tunneling units into the tunnel to the tunneling distance and using them as support structures, repeating the steps B and C for drilling, slurry injecting, supporting with thin steel plates, excavating and digital image capturing whenever the tunnel is excavated by a preset distance, till the model tunneling test of the surrounding rock position field of the entire tunnel is accomplished.

Beneficial effect: the multi-functional intelligent tunneling apparatus and method for simulating partial excavation of tunnel provided in the present disclosure can simulate partial excavation steps of tunnel excellently, ranging from drilling, slurry injecting, partial excavation with different construction methods (including full-section excavation, excavation with a center diaphragm method, excavation with a cross diaphragm method, excavation with a three-bench method, excavation with the combination of a three-bench method and a center diaphragm method, excavation with a three-bench seven-step method, and excavation with a double side drift method), supporting and data postprocessing and analyzing of test. Compared with the prior art, the present disclosure has the following advantages:

(1) Full-section slurry injection and partial-face slurry injection can be carried out for the cross section of a tunnel, and the depth and specific position of slurry injection are controllable;
(2) Switchover between different excavation methods can be realized in the tunneling process, the excavation distance can be controlled accurately, and simple supporting can be carried out timely; the unexcavated rock mass cannot be disturbed and similar excavated materials can be cleared successfully in a clean state owing to the good tightness of the independent tunneling units;
(3) The apparatus employs a contactless digital camera device, which can be used in combination with computer image post-processing and analysis techniques conveniently to monitor and analyze the displacement of the surrounding rock of the tunnel in the excavation process;
(4) The apparatus employs devices, such as micro cameras, a digital display control box and a computer, the digital display control box controls the entire apparatus automatically to realize highly intelligent and fine operations; thus, the apparatus can be operated independently by one person.

Figure 1:
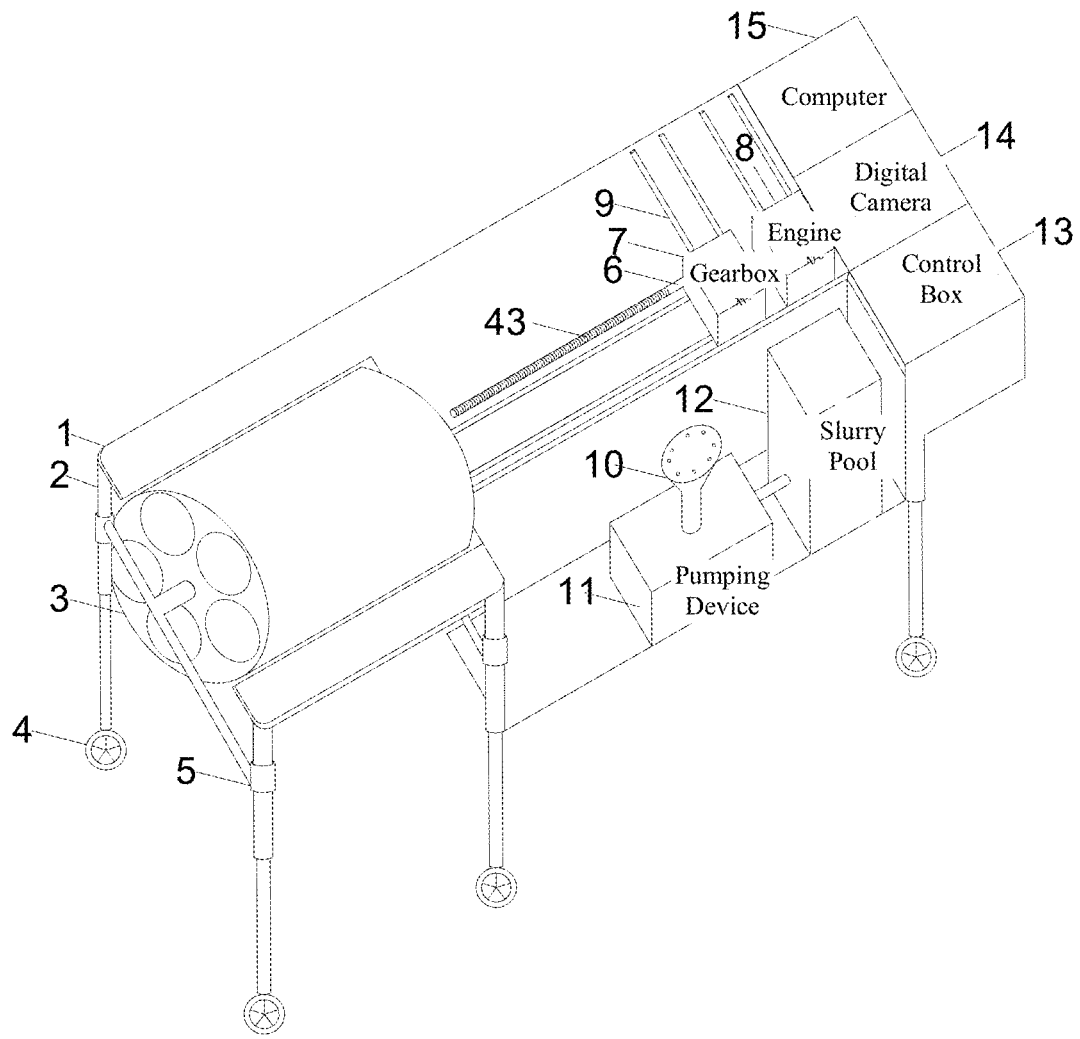
FIG. 1 is a perspective schematic structural view of the apparatus in the present disclosure.

In the figures: 1—operating platform board; 2—elevating leg; 3—multi-functional rotary tunneling bucket; 4—roller; 5—elevating device; 6—transmission shaft; 7—gearbox; 8—engine; 9—semi-circular groove track; 10—slurry guide injector; 11—pumping device; 12—slurry pool; 13—digital display control box; 14—digital camera device; 15—computer; 16—channel for tunneling with a cross diaphragm method; 17—channel for tunneling with the combination of a center diaphragm method and a three-bench method; 18—channel for tunneling with a three-bench seven-step method; 19—channel for tunneling with a double side drift method; 20—drilling and slurry injecting channel; 21—drill way; 22—support shaft; 23—spring control button; 24—telescopic spring key; 25—four-direction connection steel member; 26—independent tunneling unit for tunneling with a cross diaphragm method; 27—tunneling cutter; 28—micro camera; 29—thin steel plate; 30-31—independent tunneling unit for tunneling with the combination of a center diaphragm method and a three-bench method; 32-35—independent tunneling unit for tunneling with a three-bench seven-step method; 36—three-direction connection steel member; 37—2 mm curved thin steel plate; 38-39—independent tunneling unit for tunneling with a double side drift method; 40—screw propulsion rod; 41—female thread; 42—scale mark; 43—male thread; 44—steel ball; 45—drilling steel shaft; 46—hydraulic sensor; 47—slurry conveying tube; 48—rubber hose; 49—slurry injecting guide tube; 50—drilling and slurry injecting propulsion unit; 51—spring compensator; 60-80—circular hole.

DETAILED DESCRIPTION OF THE PREFERRED EMBODIMENTS

Hereunder the present disclosure will be further described with reference to the embodiments and drawings.

The multi-functional intelligent tunneling apparatus for simulating partial excavation of tunnel provided in the present disclosure comprises a multi-functional rotary tunneling system, a precision power propulsion system and an information acquiring and processing system, wherein, the multi-functional rotary tunneling system comprises a multi-functional rotary tunneling bucket and an elevating device, wherein, the multi-functional rotary tunneling bucket includes several operating channels independent from each other (e.g., a channel for tunneling with a cross diaphragm method, a channel for tunneling with the combination of a center diaphragm method and a three-bench method, a channel for tunneling with a three-bench seven-step method, a channel for tunneling with a double side drift method, and a channel for drilling and slurry injecting, etc.) to realize excavation with different partial excavation methods (e.g., full-section excavation, excavation with a center diaphragm method, excavation with a cross diaphragm method, excavation with a three-bench method, excavation with the combination of a three-bench method and a center diaphragm method, excavation with a three-bench seven-step method, and excavation with a double side drift method, etc.).

Specifically, the drilling and slurry injecting channel includes a cross diaphragm support plate and four independent propulsion units, two drilling steel shafts with the diameter of 5 mm are provided at the front end of the propulsion units, the front end of the steel shaft is a cone, the tail end of the solid steel shaft is provided with a spring compensator to change the angle of the drilling steel shaft, two slurry conveying tubes are provided inside the propulsion unit, and hydraulic sensors are provided to monitor slurry injecting pressure; after the drilling work is finished, the drilling steel shafts can be replaced with the slurry injecting guide tubes; the front end of the slurry injecting guide tube is a hollow cone, and the surface of the slurry injecting guide tube is arranged with slurry-permeable circular holes, and the slurry conveying tube is connected to the slurry guide injector via a rubber hose to form a complete slurry injecting channel. The precision power propulsion system comprises a screw propulsion rod with scale marks, a transmission shaft with threads in the surface, an engine and a gearbox, wherein the inner surface of the screw propulsion rod is provided with threads that match the threads on the surface of the transmission shaft, a spring control button and a telescopic spring key are provided on the front end of the screw propulsion rod to connect the independent tunneling unit or the slurry injecting propulsion unit, rotatable steel balls that match the semi-circular groove track in size are provided below the engine and the gearbox, the surface of the gearbox is provided with circular holes that match the transmission shaft in size to realize accurate partial excavation or full-section excavation of the tunnel with different construction methods.

FIGS. 1-9 show a preferred embodiment of the present disclosure, i.e., a multi-functional intelligent tunneling apparatus for simulating partial excavation of tunnel, which mainly comprises an operating platform board 1, elevating legs 2, a multi-functional rotary tunneling bucket 3, rollers 4, an elevating device 5, a transmission shaft 6, a gearbox 7, an engine 8, a semi-circular groove track 9, a slurry guide injector 10, a pumping device 11, a slurry pool 12, an automatic control box 13, a digital camera system 14 and a computer 15.

Figure 2:
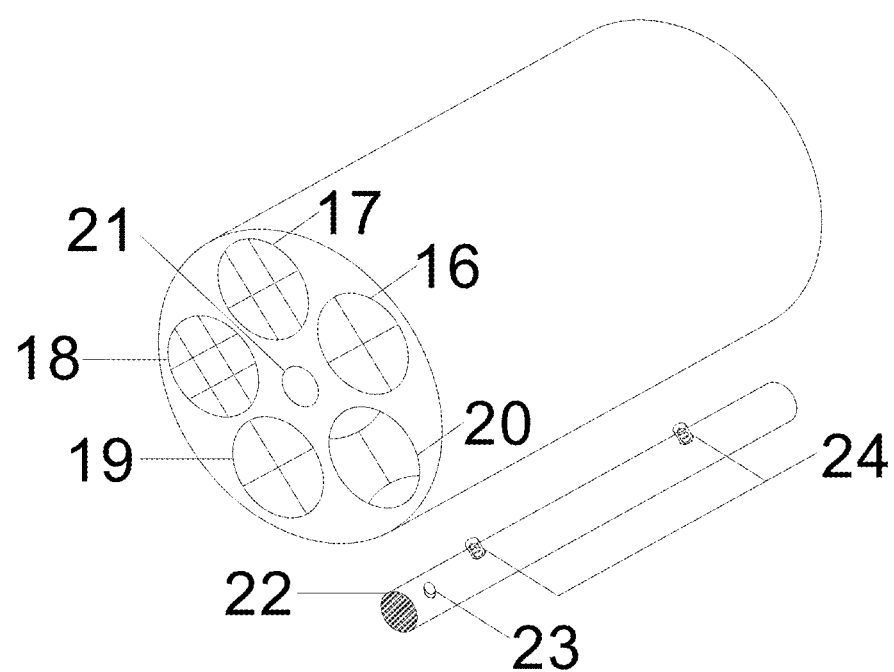
FIG. 2 is a perspective schematic structural view of the multi-functional rotary tunneling bucket in FIG. 1.
Figure 3:
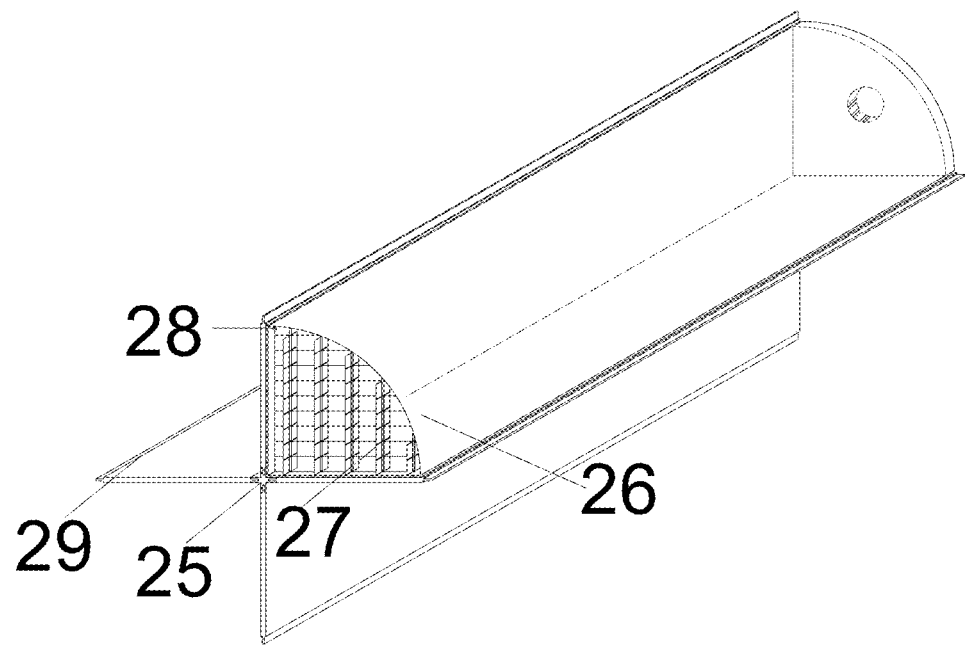
FIG. 3 is a schematic structural view of the channel for tunneling with a cross diaphragm method.
Figure 4:
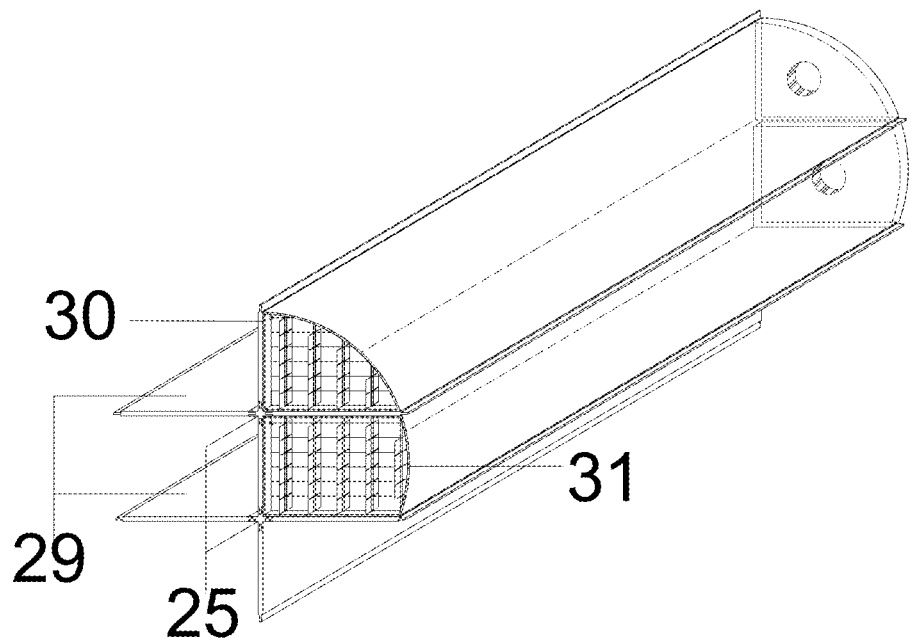
FIG. 4 is a schematic structural view of the channel for tunneling with the combination of a center diaphragm method and a three-bench method.
Figure 5:
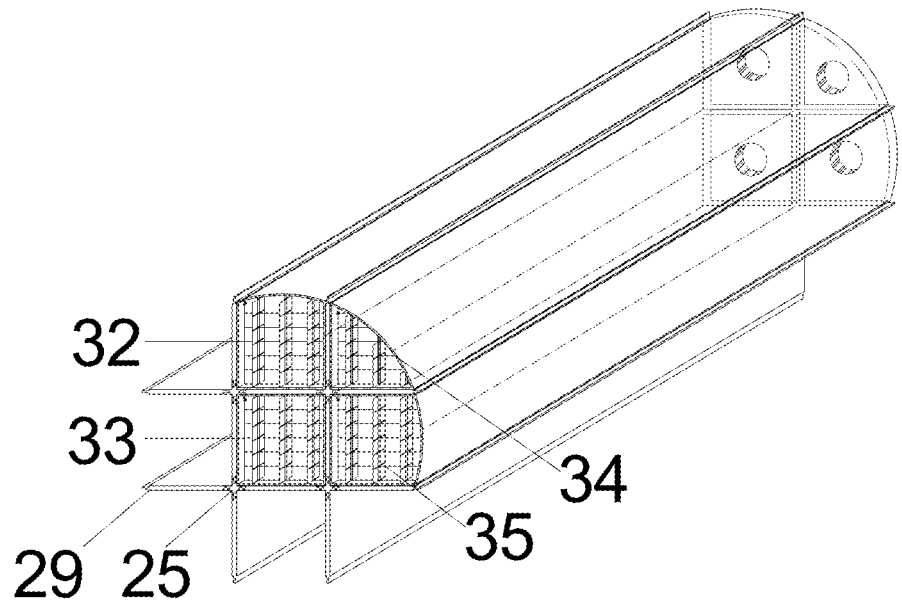
FIG. 5 is a schematic structural view of the channel for tunneling with a three-bench seven-step method.
Figure 6:
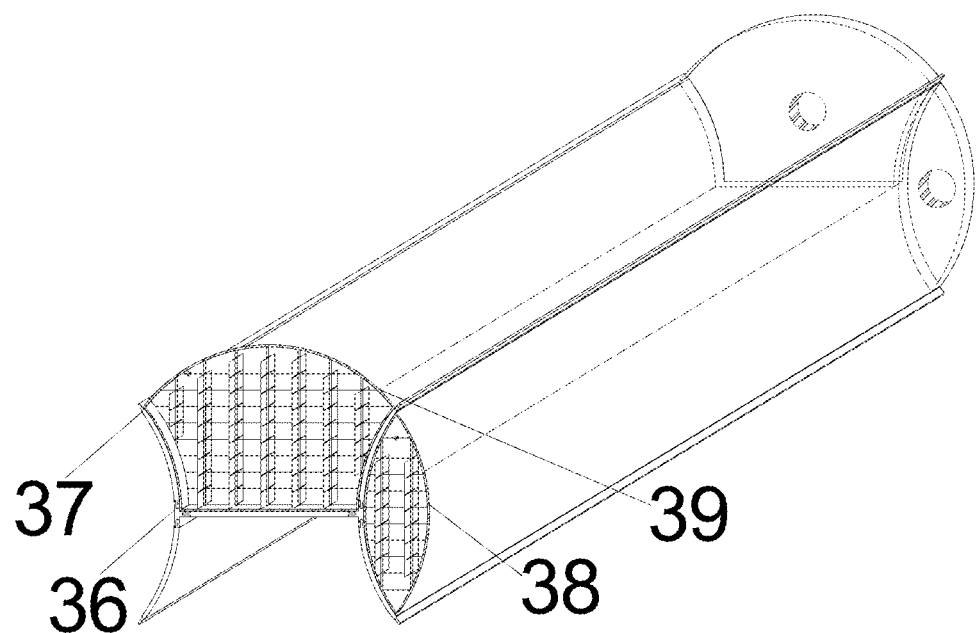
FIG. 6 is a schematic structural view of the channel for tunneling with a double side drift method.
Figure 7:
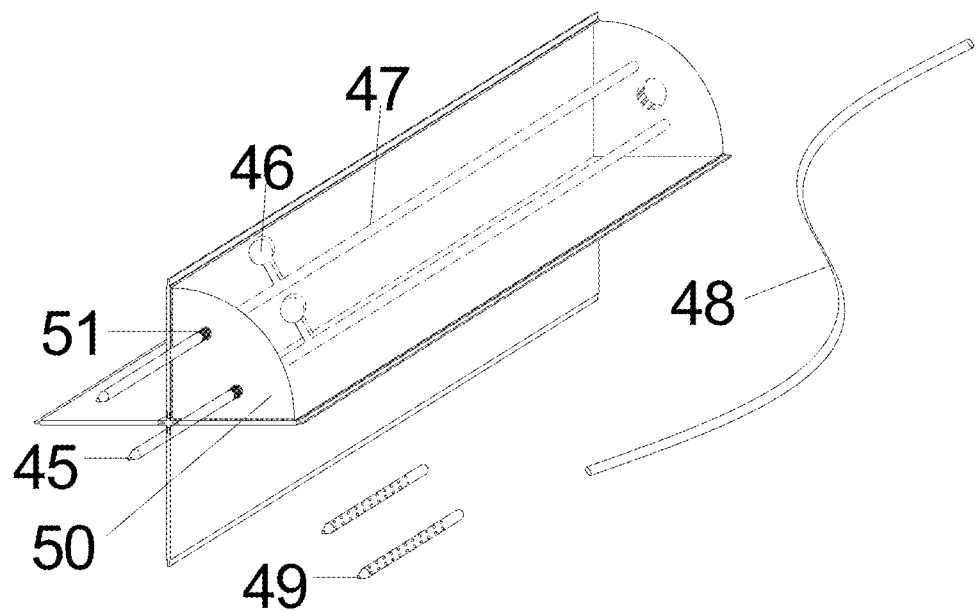
FIG. 7 is a schematic structural view of the drilling and slurry injecting channel.
Figure 8:
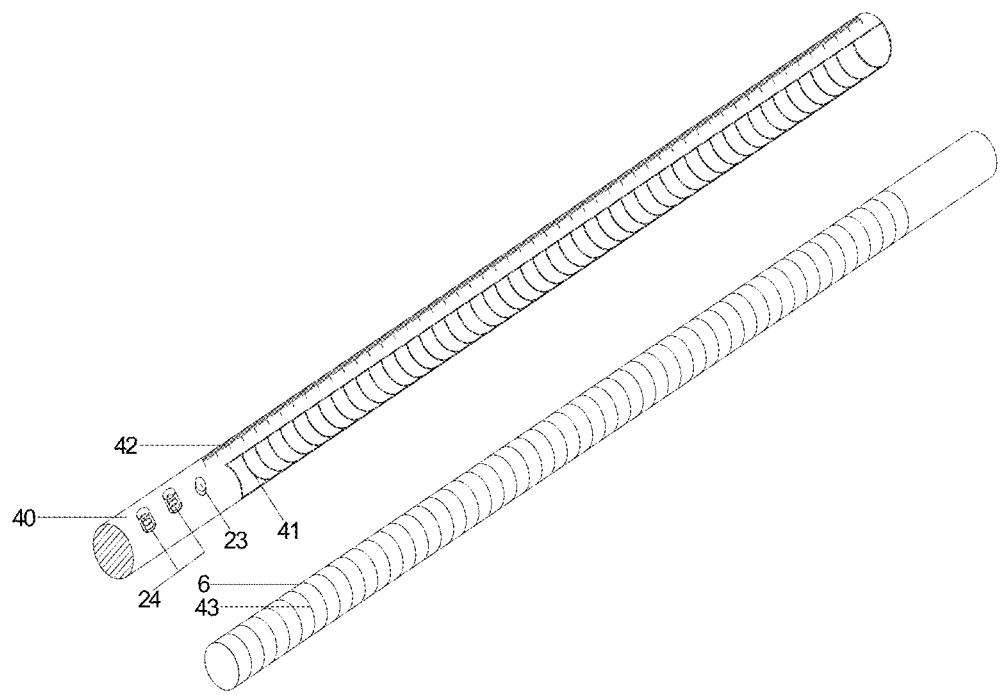
FIG. 8 is a schematic structural view of the screw propulsion rod and transmission shaft.
Figure 9:
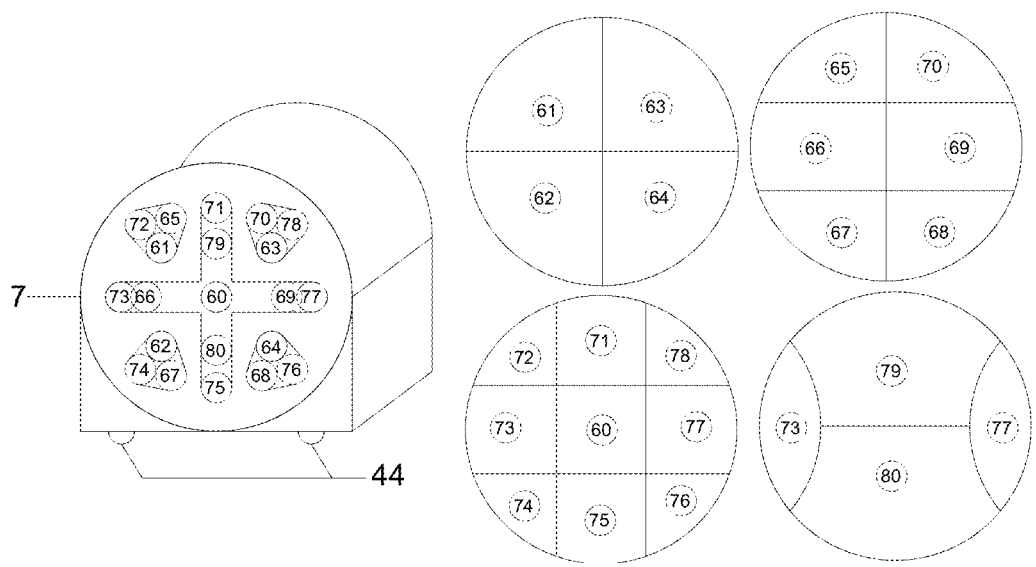
FIG. 9 is a schematic structural view of the gearbox.

As shown in FIG. 2, the multi-functional rotary tunneling bucket 3 and the elevating device 5 are connected by fitting the support shaft 22 into the preformed drill way 21, and are fixed by means of the spring control button 23 and the telescopic spring key 24. As shown in FIG. 3, the removable cross diaphragm support plate is mainly composed of one four-direction connection steel member 25 and four thin steel plates 29 in thickness of 2 mm. As shown in FIG. 4, the removable support plate for tunneling with the combination of a center diaphragm method and a three-bench method is mainly composed of two four-direction connection steel members and seven thin steel plates in thickness of 2 mm. As shown in FIG. 5, the removable support plate for tunneling with a three-bench seven-step method is mainly composed of four four-direction connection steel members and ten thin steel plates in thickness of 2 mm. As shown in FIG. 6, the removable support plate for tunneling with a double side drift method is mainly composed of two three-direction connection steel members 36, four curved thin steel plates 37 in thickness of 2 mm and one planar thin steel plate. The independent tunneling units are disposed between the above-mentioned tunneling channels and support plates. As shown in FIGS. 3, 4, 5 and 6, a tunneling cutter 27 is provided inside the independent tunneling units 26, 30, 31, 32, 33, 34, 35, 38 and 39 respectively, the tunneling cutter 27 is provided with several rotatable cylindrical steel shafts in diameter of 3 mm in the vertical direction, a cutter made of thin steel plates in thickness of 0.2 mm is arranged at the front side and back side of steel shaft, and steel wires in diameter of 0.2 mm are arranged at a fixed interval in the horizontal direction. As shown in FIG. 7, a drilling and slurry injecting propulsion unit 50 is provided inside the drilling and slurry injecting propulsion channel 19, the front end of the propulsion unit is provided with two solid steel shafts 45 in diameter of 5 mm for drilling, the tail end of the steel shaft is provided with a spring compensator 51 to change the angle of the drilling steel shaft, and the drilling steel shaft is replaced by the slurry injecting guide tube 49 after the drilling is finished; two slurry conveying tubes 47 made of thin steel plates are provided inside the drilling and slurry injecting propulsion unit, and is equipped with a hydraulic sensor 46 to monitor the change of slurry injecting pressure, and the drilling and slurry injecting propulsion unit is connected with the slurry conveying tubes 47 via rubber hoses 48 to form complete slurry injecting channels. As shown in FIGS. 8 and 9, the inner surface of the screw propulsion rod 40 is provided with threads that match the threads 43, the front end of the screw propulsion rod 40 is provided with a spring control button 23 and a telescopic spring key 24 to connect the independent tunneling unit or the propulsion unit 50, and rotatable steel balls 44 that match the semi-circular groove track 9 in size are provided below the engine 8 and the gearbox 7; the surface of the gearbox 7 is provided with circular holes 60-80 that match the transmission shaft 6 in size, to realize accurate partial excavation or full-section excavation of the tunnel with different construction methods.

The testing method for the multi-functional intelligent tunneling apparatus for simulating partial excavation of tunnel in the present disclosure comprises the following steps specifically:

Step A: Preparation Before Testing

Adjusting the digital display control box, placing the gearbox and the engine in the home positions, adjusting the elevating device so that the drilling and slurry injecting channel is aligned with the cross section of a tunnel to be excavated, injecting a prepared slurry into the slurry pool, fitting the screw propulsion rod over the transmission shaft, connecting the slurry guide injector and the slurry conveying tube via the rubber hose, according to the test needs, selecting a position of the cross section of the tunnel where the slurry is to be injected, determining the number of the drilling steel shafts and the rubber hoses to be used, and finally connecting the screw propulsion rod with the drilling and slurry injecting propulsion unit via the spring control button on the support shaft;

Step B: Drilling and Slurry Injecting

After the preparation work in the step A, setting a propulsion distance and drilling angle of the drilling steel shaft via the digital display control box, starting the engine to propel the drilling steel shaft into the cross section of the tunnel to the preset distance and then withdrawing the drilling steel shaft, replacing the drilling steel shaft with the slurry injecting guide tube, drilling into the rock mass to a predetermined position and starting slurry injection, observing the change of the value on the hydraulic sensor via a display unit on the digital display control box, and terminating the slurry injection when reaching a preset value;

Step C: Supporting with the Thin Steel Plate, Excavating, and Capturing Image

After the step B is finished, rotating the multi-functional rotary tunneling bucket to align with the tunnel excavation position by tunneling with a cross diaphragm method after the rock mass is excavated, mounting the transmission shaft on a preset position of the circular holes on the surface of the gearbox, and fitting the corresponding rotary propulsion rod over the transmission shaft, then connecting the four independent tunneling units, adjusting the digital display control box to make the thin steel plates on the tunneling cutters to be perpendicular to the excavated cross section of the tunnel, then starting the engine to excavate by any one of the 5 excavation ways of full-section excavation by propelling four tunneling units simultaneously, excavation with a center diaphragm method or two-bench method by propelling two tunneling units simultaneously, and excavation with a cross diaphragm method by propelling one tunneling unit at a time; monitoring the excavation process in real time with the micro cameras and the computer during the excavation process, adjusting the tunneling cutters when reaching a preset distance, so that the steel shafts of the tunneling cutters are rotated by 90 degree and the thin steel cutters and the tunneling units are sealed, then withdrawing the tunneling units in a screwed manner; at this time, activating the digital camera device to capture images of the excavated cross section of tunnel continuously and uploading the image data, for monitoring and analyzing the surrounding rock position field of the tunnel in the entire process.

Step D: Repeating Till Completion of the Work

After tunneling with the independent tunneling units for the first time, pushing the thin steel plates in contact with the tunneling units into the tunnel to the tunneling distance and using them as support structures, repeating the steps B and C for drilling, slurry injecting, supporting with thin steel plates, excavating and digital image capturing whenever the tunnel is excavated by a preset distance, till the tunneling in the model test of the surrounding rock position field of the entire tunnel is accomplished.

Specifically, the specific steps for simulating tunneling with a three-bench seven-step excavation method in the present disclosure are as follows:

(1) Before the test, the automatic control box 13 is adjusted to place the gearbox 7 and the engine 8 in the home positions, the elevating device 5 is adjusted so that the drilling and slurry injecting channel 19 is aligned with the cross section of a tunnel to be excavated, a prepared slurry is injected into the slurry pool 12, a transmission shaft 6 is mounted at a position of the circular holes 72, 71, 78, 73, 60, 77, 74, 75, and 76 on the surface of the gearbox (i.e., the channel 18 for tunneling with a three-bench seven-step method is selected), the screw propulsion rod 40 is fitted over the transmission shaft 6, the slurry guide injector 10 is connected with the slurry conveying tube 47 via the rubber hose 48, the position of the cross section of the tunnel where the slurry is to be injected is selected according to the specific requirement of the test, and then the number of the drilling steel shafts 45 and the rubber hoses to be used is selected, the steel shaft that is not used can be removed, the slurry port that is not used on the slurry guide injector can be sealed with a plug, and finally the screw propulsion rod 40 is connected with the independent slurry injecting propulsion unit 50 by means of the spring control button 23;

(2) The propulsion distance and drilling angle of the drilling steel shaft 45 are set via the digital display control box 13, the engine 8 is started to propel the drilling steel shaft into the cross section of the tunnel to a preset distance, and then the drilling steel shaft is withdrawn and replaced with the slurry injecting guide tube 49, the slurry injecting guide tube 49 is propelled into the rock mass to a predetermined position and slurry injection is started while the change of the value on the hydraulic sensor 46 is observed via a display unit on the digital display control box 13; the slurry injection is terminated when a preset value is reached;

(3) The multi-functional rotary tunneling bucket 3 is rotated via the digital display control box 13 to align the channel 18 for tunneling with a three-bench seven-step method with the excavated cross section of tunnel after the rock mass can be excavated, the digital display control box is adjusted so that the thin steel cutters on the tunneling cutter 27 are perpendicular to the cross section to be excavated, then the engine is started, and the tunneling and excavating of the first unit is carried out via the transmission shaft at the circular hole 71, the excavation process is monitored in real time with the micro cameras and the computer during the excavation process; when a preset distance is reached, the tunneling cutter 27 is adjusted via the digital display control box so that the steel shaft of the tunneling cutter is rotated by 90 degree and thereby the thin steel cutters are parallel to the tunnel face; after the excavation is finished, withdrawn from the first tunneling unit, by rotating the thin steel cutters by 90 degree again, the connection between the rotary propulsion rod 40 and the tunneling unit is disconnected, and withdrawn from the tunneling unit in a screwed manner; the engine, the gearbox and the transmission shaft are pushed aside along the preformed semi-circular groove track 9, the digital camera device is opened to continuously capture images of the excavated cross section of tunnel with the high-resolution digital camera, and the images are analyzed with image processing software, so as to monitor and analyze the position field of the surrounding rock of the tunnel in the entire process;

(4) After tunneling in the corresponding first tunneling unit at the circular hole 71 for the first time is finished, tunneling in other independent tunneling units is started. As shown in FIG. 9, tunneling is carried out in order of circular holes 72, 71, 78, 73, 60, 77, 74, 75 and 76; after the tunneling in each independent tunneling unit is finished, the steps of drilling, slurry injecting, digital image capturing and thin steel plate supporting are repeated if required, till the tunneling in the entire model test is accomplished.

The above are only preferred embodiments of the present invention. It should be pointed out that for those of ordinary skill in the art, several improvements and modifications can be made without departing from the principle of the present invention, and these improvements and modifications should also be deemed as falling into the protection scope of the present invention.

What is claimed is:

1. A multi-functional intelligent tunneling apparatus for simulating partial excavation of tunnel, comprising an operating platform, a slurry pumping system, a multi-functional rotary tunneling system, a precision power propulsion system, and an information acquiring and processing system, wherein, the operating platform comprises an operating platform board, a slurry pool and a pumping device which are used to constitute a slurry pumping system are provided on one side of the operating platform board, and a slurry guide injector used to inject slurry into the slurry pool is provided above the pumping device;

the multi-functional rotary tunneling system comprises a multi-functional rotary tunneling bucket, a support shaft and an elevating device, wherein the multi-functional rotary tunneling bucket is mounted on the operating platform board, the elevating device is mounted on the bottom of the operating platform board to adjust the position, a set of operating channels independent from each other are disposed inside the multi-functional rotary tunneling bucket to perform drilling, slurry injecting or excavating work, the support shaft is mounted inside the multi-functional rotary tunneling bucket and the positions between the support shaft and respective operating channels are adjustable;

the precision power propulsion system comprises a screw propulsion rod, a transmission shaft, a semi-circular groove track disposed on the operating platform board, an engine and a gearbox, wherein, the engine and the gearbox are slidably mounted in the semi-circular groove track, one end of the transmission shaft is connected to the screw propulsion rod, the other end of the transmission shaft is connected to the gearbox, a set of circular holes matching with the transmission shaft in size are arranged in the surface of the gearbox, the circular holes are arranged in a preset shape to match different tunneling channels inside the multi-functional rotary tunneling bucket, so as to realize accurate partial excavation or full-section excavation of the tunnel with different construction methods, one end of the screw propulsion rod is connected to the transmission shaft, and the other end of the screw propulsion rod is connected to the independent operating channels;

the information acquiring and processing system comprises a digital display control box for intelligent controlling the entire apparatus, a detection device for acquiring parameter information in the drilling, slurry injecting, or excavating process, and a computer for data processing, analyzing and displaying, wherein the digital display control box and the computer are communicatively connected with each other.

2. The multi-functional intelligent tunneling apparatus for simulating partial excavation of tunnel according to claim 1, wherein, the operating channels comprise a channel for tunneling with a cross diaphragm method, a channel for tunneling with the combination of a center diaphragm method and a three-bench method, a channel for tunneling with a three-bench seven-step method, a channel for tunneling with a double side drift method, which are used for accurate partial excavation or full-section excavation of the tunnel with different construction methods, and a drilling and slurry injecting channel for drilling and slurry injecting;

the detection device comprises a digital camera device, a micro camera and a hydraulic sensor disposed on the operating platform board, wherein the digital camera device is configured to acquire image data of a tunnel excavation section;

diaphragm support plates and independent tunneling units separated by the diaphragm support plates are provided in the channel for tunneling with a cross diaphragm method, the channel for tunneling with the combination of a center diaphragm method and a three-bench method, the channel for tunneling with a three-bench seven-step method, and the channel for tunneling with a double side drift method respectively, and one cross diaphragm support plate and four independent drilling and slurry injecting propulsion units are comprised in the drilling and slurry injecting channel, the rear ends of each independent tunneling unit and each drilling and slurry injecting propulsion unit are provided with preformed circular holes, and the other end of the screw propulsion rod is connected to the corresponding independent tunneling unit or drilling and slurry injecting propulsion unit through the preformed circular hole;

a tunneling cutter is provided on the front end of the independent tunneling units respectively, the micro camera is mounted on the tunneling cutter for real-time monitoring in the tunneling process; several rotary cylindrical steel shafts are provided on the tunneling cutter in the vertical direction, a cutter made of a thin steel plate is provided on the front side and back side of each cylindrical steel shaft, and steel wires are provided on the tunneling cutter at a fixed interval in the horizontal direction;

a drilling steel shaft or slurry injecting guide tube is provided on the front end of the drilling and slurry injecting propulsion unit and a slurry conveying tube is provided inside the drilling and slurry injecting propulsion unit, the slurry conveying tube is provided with a hydraulic sensor to monitor slurry injecting pressure, wherein, the drilling steel shaft is installed when drilling, and the drilling steel shaft is replaced with the slurry injecting guide tube after drilling, the slurry conveying tube and the slurry guide injector are connected with each other via a rubber hose to form a complete slurry injecting channel.

3. The multi-functional intelligent tunneling apparatus for simulating partial excavation of tunnel according to claim 2, wherein, the front end of the drilling steel shaft is a cone, and tail end of the drilling steel shaft is provided with a spring compensator to change the angle of the drilling steel shaft, the front end of the slurry injecting guide tube is a hollow cone, and slurry-permeable circular holes are provided on the surface of the slurry injecting guide tube.

4. The multi-functional intelligent tunneling apparatus for simulating partial excavation of tunnel according to claim 2, wherein, the diaphragm support plate inside the channel for tunneling with a cross diaphragm method is a removable cross diaphragm support plate composed of one four-direction connection steel member and four thin steel plates connected with the four-direction connection steel member, one end of the thin steel plate is connected with the four-direction connection steel member, and the other end of the thin steel plate is embedded in the channel for tunneling with a cross diaphragm method.

5. The multi-functional intelligent tunneling apparatus for simulating partial excavation of tunnel according to claim 2, wherein, the diaphragm support plate in the channel for tunneling with the combination of a center diaphragm method and a three-bench method is mainly composed of two four-direction connection steel members and seven thin steel plates; the diaphragm support plate in the channel for tunneling with a three-bench seven-step method is mainly composed of four four-direction connection steel members and ten thin steel plates; the diaphragm support plate in the channel for tunneling with a double side drift method is mainly composed of two three-direction connection steel members, four curved thin steel plates and one planar thin steel plate.

6. The multi-functional intelligent tunneling apparatus for simulating partial excavation of tunnel according to claim 2, wherein, male threads are provided on the surface of the transmission shaft, scale marks are provided on the outer surface of the screw propulsion rod and female threads that match the male threads are provided on the inner surface, and a spring control button and a telescopic spring key are provided on the front end of the screw propulsion rod; when the spring button is pressed, the telescopic spring key is retracted into the rod; the screw propulsion rod is inserted into the preformed circular hole, and then the spring button is released; the telescopic spring key is located on two sides of the preformed circular hole, and the screw propulsion rod is fixed for connecting the independent tunneling unit or drilling and slurry injecting propulsion unit.

7. The multi-functional intelligent tunneling apparatus for simulating partial excavation of tunnel according to claim 2, wherein, the support shaft is provided with a spring control button and a telescopic spring key, wherein the spring control button is configured to open and close the telescopic spring key; a drill way for accommodating the support shaft is provided in the multi-functional rotary tunneling bucket, and a cylindrical groove to be fitted with the telescopic spring key is provided between each independent operating channel and the drill way.

8. The multi-functional intelligent tunneling apparatus for simulating partial excavation of tunnel according to claim 2, wherein, rotatable steel balls that matches the semi-circular groove track in size are provided below the engine and the gearbox.

9. The multi-functional intelligent tunneling apparatus for simulating partial excavation of tunnel according to claim 1, wherein the elevating device includes an elevating table leg provided under the operating platform board with rollers at the bottom.

10. A testing method utilizing the multi-functional intelligent tunneling apparatus for simulating partial excavation of tunnel according to claim 2, wherein, comprises the following operating steps:

step A: preparation before testing adjusting the digital display control box, placing the gearbox and the engine in the home positions, adjusting the elevating device so that the drilling and slurry injecting channel is aligned with the cross section of a tunnel to be excavated, injecting a prepared slurry into the slurry pool, fitting the screw propulsion rod over the transmission shaft, connecting the slurry guide injector and the slurry conveying tube via the rubber hose, according to the test needs, selecting a position of the cross section of the tunnel where the slurry is to be injected, determining the number of the drilling steel shafts and the rubber hoses to be used, and finally connecting the screw propulsion rod with the drilling and slurry injecting propulsion unit via the support shaft;

step B: drilling and slurry injection after the preparation work in the step A, setting a propulsion distance and drilling angle of the drilling steel shaft via the digital display control box, starting the engine to propel the drilling steel shaft into the cross section of the tunnel to the preset distance and then withdrawing the drilling steel shaft, replacing the drilling steel shaft with the slurry injecting guide tube, drilling into the rock mass to a predetermined position and starting slurry injection, observing the change of the value on the hydraulic sensor via a display unit on the digital display control box, and terminating the slurry injecting when reaching a preset value;

step C: supporting with the thin steel plate, excavating, and capturing image after the step B is finished, rotating the multi-functional rotary tunneling bucket to align with the tunnel excavation position after the rock mass can be excavated, mounting the transmission shaft on a preset position of the circular holes on the surface of the gearbox, and fitting the corresponding rotary propulsion rod over the transmission shaft, then connecting the four independent tunneling units, adjusting the digital display control box to make the thin steel plates on the tunneling cutters to be perpendicular to the excavated cross section of the tunnel, then starting the engine to excavate by any one of the excavation ways of full-section excavation by propelling four tunneling units simultaneously, excavation with a center diaphragm method or two-bench method by propelling two tunneling units simultaneously, and excavation with a cross diaphragm method by propelling one tunneling unit at a time; monitoring the excavation process in real time with the micro cameras and the computer during the excavation process, adjusting the tunneling cutters when reaching a preset distance, so that the steel shafts of the tunneling cutters are rotated by 90 degree and the thin steel cutters and the tunneling units are sealed, then withdrawn from the tunneling units in a screwed manner; at this time, activating the digital camera device to capture images of the cross section of tunnel excavation continuously and uploading the image data, for monitoring and analyzing the surrounding rock position field of the tunnel in the entire process;

step D: repeating till completion of the work after tunneling in the independent tunneling units for the first time, pushing the thin steel plates in contact with the tunneling units into the tunnel to the tunneling distance and using them as support structures, repeating the steps B and C for drilling, slurry injecting, supporting with thin steel plates, excavating and digital image capturing whenever the tunnel is excavated by a preset distance, till the tunneling in the model test of the surrounding rock position field of the entire tunnel is accomplished.

* * * * *